US009690524B2

(12) United States Patent
Omura

(10) Patent No.: US 9,690,524 B2
(45) Date of Patent: Jun. 27, 2017

(54) MANAGING PRINT SETTINGS IN MULTIPLE EXECUTION ENVIRONMENTS

(71) Applicant: CANON KABUSHIKI KAISHA, Tokyo (JP)

(72) Inventor: Hiroshi Omura, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/617,030

(22) Filed: Feb. 9, 2015

(65) Prior Publication Data
US 2015/0261480 A1 Sep. 17, 2015

(30) Foreign Application Priority Data

Mar. 14, 2014 (JP) .................................. 2014-052435

(51) Int. Cl.
*G06F 3/12* (2006.01)
(52) U.S. Cl.
CPC .......... *G06F 3/1231* (2013.01); *G06F 3/1205* (2013.01); *G06F 3/1253* (2013.01); *G06F 3/1257* (2013.01); *G06F 3/1285* (2013.01); *G06F 3/1287* (2013.01); *G06F 3/1228* (2013.01); *G06F 3/1255* (2013.01)

(58) Field of Classification Search
CPC .... G06F 3/1257; G06F 3/1205; G06F 3/1253; G06F 3/1255
See application file for complete search history.

(56) References Cited

U.S. PATENT DOCUMENTS

2005/0099645 A1* 5/2005 Saito ..................... G06F 3/1205
358/1.13
2007/0146784 A1* 6/2007 Perry ..................... G06Q 10/10
358/1.16
2010/0118321 A1* 5/2010 Ebuchi .................. G06F 3/1204
358/1.9
2011/0188065 A1* 8/2011 Hadano .................... G06F 3/12
358/1.13
2013/0063753 A1* 3/2013 Mitsui ................... G06F 3/1204
358/1.13
2014/0029055 A1* 1/2014 Shimura ................ G06K 15/40
358/1.16
2014/0036291 A1* 2/2014 Fujishita .............. G06K 15/005
358/1.13

FOREIGN PATENT DOCUMENTS

JP 2006-331456 A 12/2006

OTHER PUBLICATIONS

European Search Report dated Sep. 2, 2015 corresponding to European Application No. EP74290.

* cited by examiner

*Primary Examiner* — Benjamin O Dulaney
(74) *Attorney, Agent, or Firm* — Fitzpatrick, Cella, Harper & Scinto

(57) ABSTRACT

To make a set of set values of a plurality of print setting items added in a first execution environment usable in a second execution environment as well, an information processing apparatus comprises: a first printer driver configured to operate in a first execution environment, and add a set of set values of a plurality of print setting items to a list; and an application corresponding to a second printer driver configured to operate in a second execution environment, and obtain the set of the set values added by the first printer driver and display the set of the set values as a choice.

17 Claims, 19 Drawing Sheets

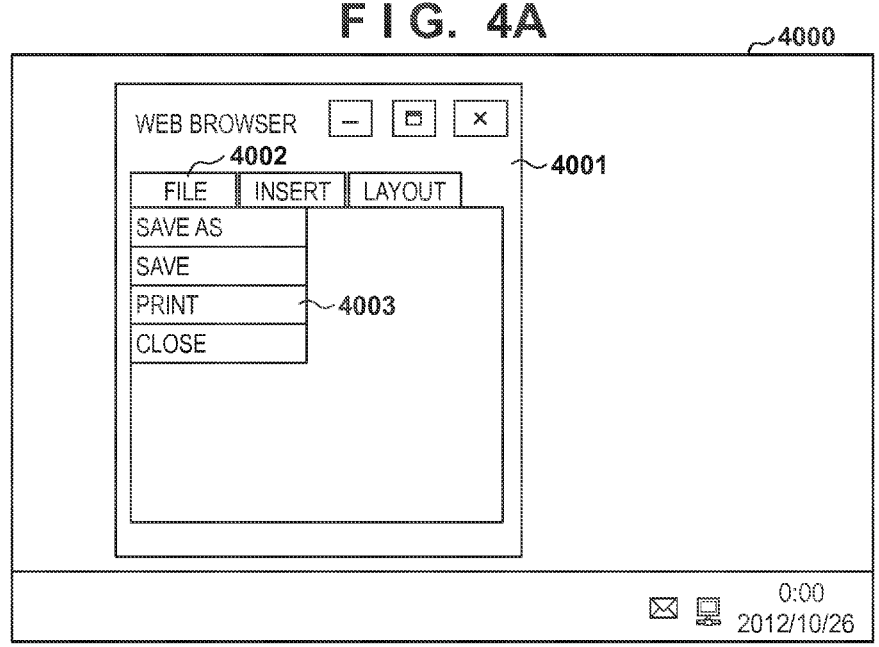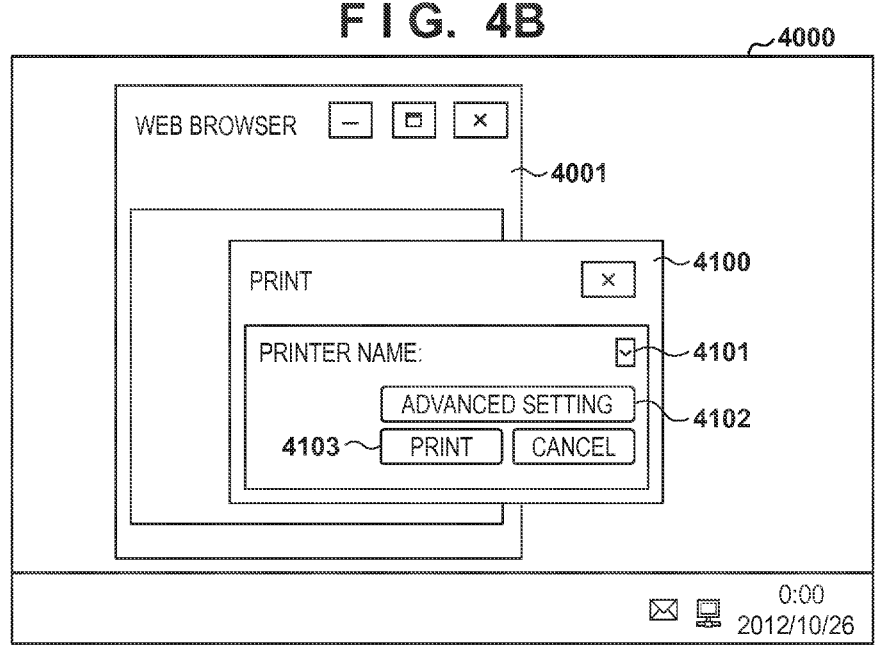

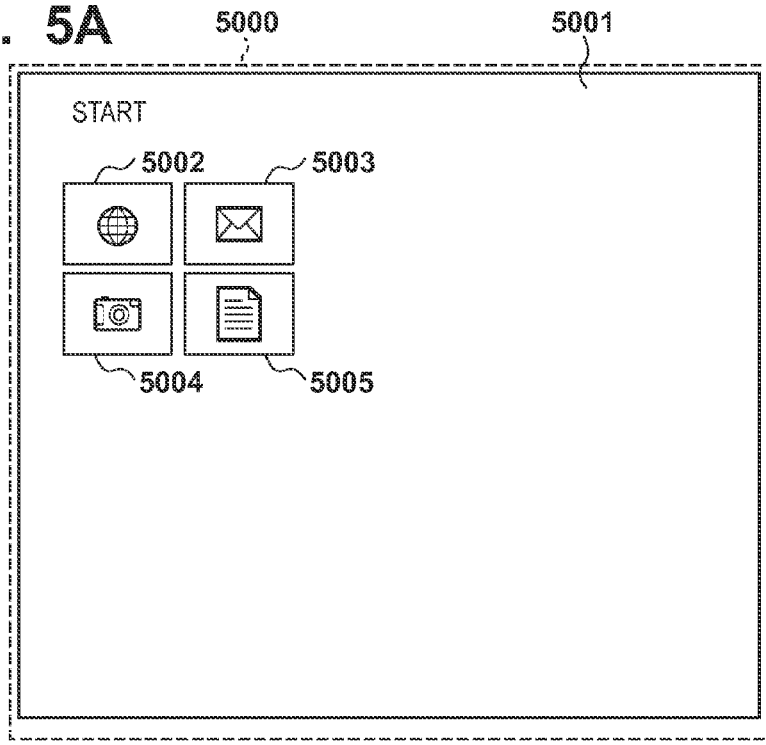
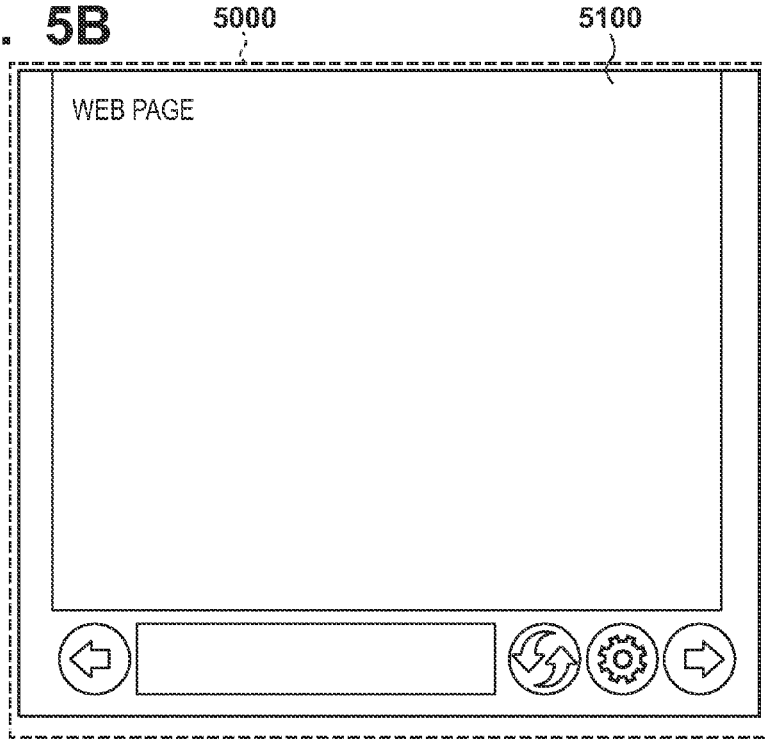

MANAGING PRINT SETTINGS IN MULTIPLE EXECUTION ENVIRONMENTS

BACKGROUND OF THE INVENTION

Field of the Invention

The present invention relates to a print setting technique.

Description of the Related Art

There is a "favorite print setting function" of giving a name to a set of set values of a plurality of print setting items and storing the set so that the user can set the plurality of print setting items at once on a UI (User Interface) used to set print output of an image processing apparatus. More specifically, there is a function of selecting, via a UI, a name corresponding to one set out of one or more sets stored and applying the set values of a plurality of print setting items corresponding to the selected name at once as the current print settings. For example, Japanese Patent Laid-Open No. 2006-331456 (patent literature 1) discloses a print setting UI having such a favorite print setting function.

SUMMARY OF THE INVENTION

In this specification, a case where a plurality of execution environments are operated in an information processing apparatus to improve convenience for a user will be examined. As an example of the plurality of execution environments, for example, one execution environment operates assuming an operation using a mouse or a keyboard, and another execution environment operates assuming an operation using a touch panel.

When operating a plurality of execution environments is assumed, the execution environments need different printer drivers or applications to do print setting. Hence, even when a set of set values of a plurality of print setting items is stored as a favorite in one execution environment, as in patent literature 1, a printer driver or application operating in another execution environment cannot use the stored set of set values.

According to one aspect of the present invention, an information processing apparatus comprises: a first printer driver configured to operate in a first execution environment, and add a set of set values of a plurality of print setting items to a list; and an application corresponding to a second printer driver configured to operate in a second execution environment, and obtain the set of the set values added by the first printer driver and display the set of the set values as a choice.

According to the present invention, a set of set values of a plurality of print setting items added in a first execution environment can be used in a second execution environment as well.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 4A to 4D are views exemplarily showing the screen of a print setting UI in a desktop UI environment;

FIGS. 5A to 5F are views exemplarily showing the screen of a print setting UI in a touch panel UI environment;

DESCRIPTION OF THE EMBODIMENTS

Preferred embodiments of the present invention will now be described in detail with reference to the accompanying drawings. Note that the following embodiments are merely examples and are not intended to limit the scope of the present invention.

First Embodiment

As an information processing apparatus according to the first embodiment of the present invention, a client computer having two user interface environments (execution environments) will be exemplified below.

<System Arrangement>

Figure 1:
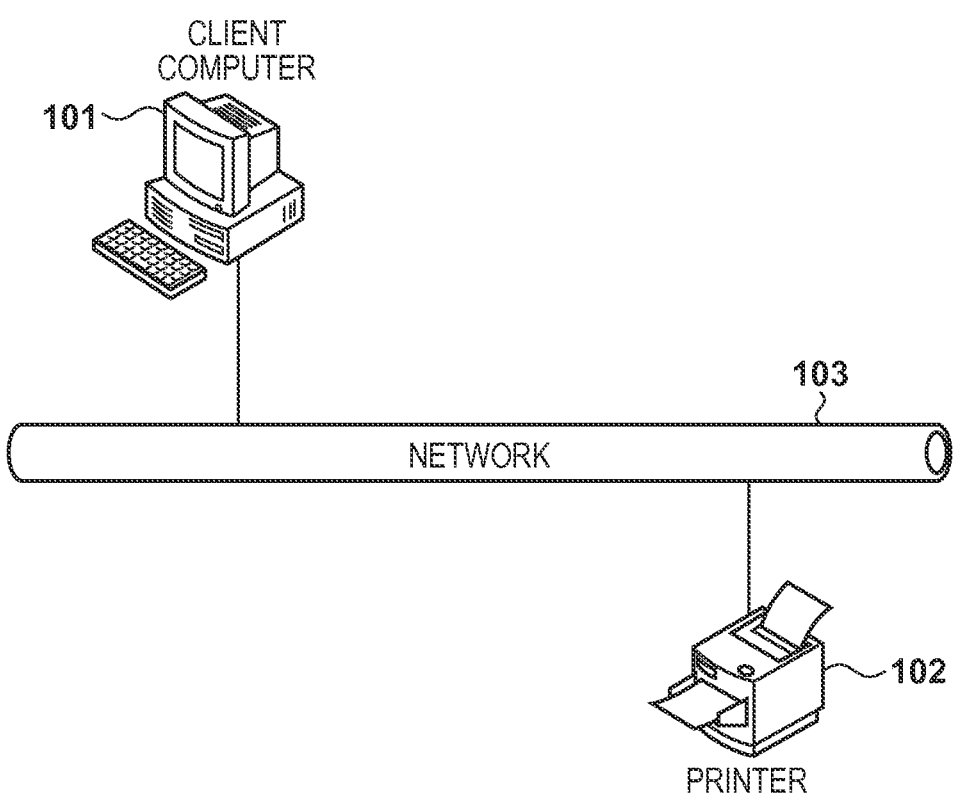
FIG. 1 is a view showing the arrangement of a system including an information processing apparatus according to the first embodiment.

FIG. 1 is a view showing the arrangement of a system including the information processing apparatus according to the first embodiment. This system includes a client computer 101 and a printer 102 capable of receiving and printing print data of PDL (Page Description Language) format. These apparatuses are connected via a network 103 represented by a LAN (Local Area Network) so as to be communicable with each other. The network 103 can connect and communicate with an external network. Note that the printer 102 can be either a single function printer having only a print function or a multifunction printer having a print function, a scan function, and a copy function.

Figure 2:
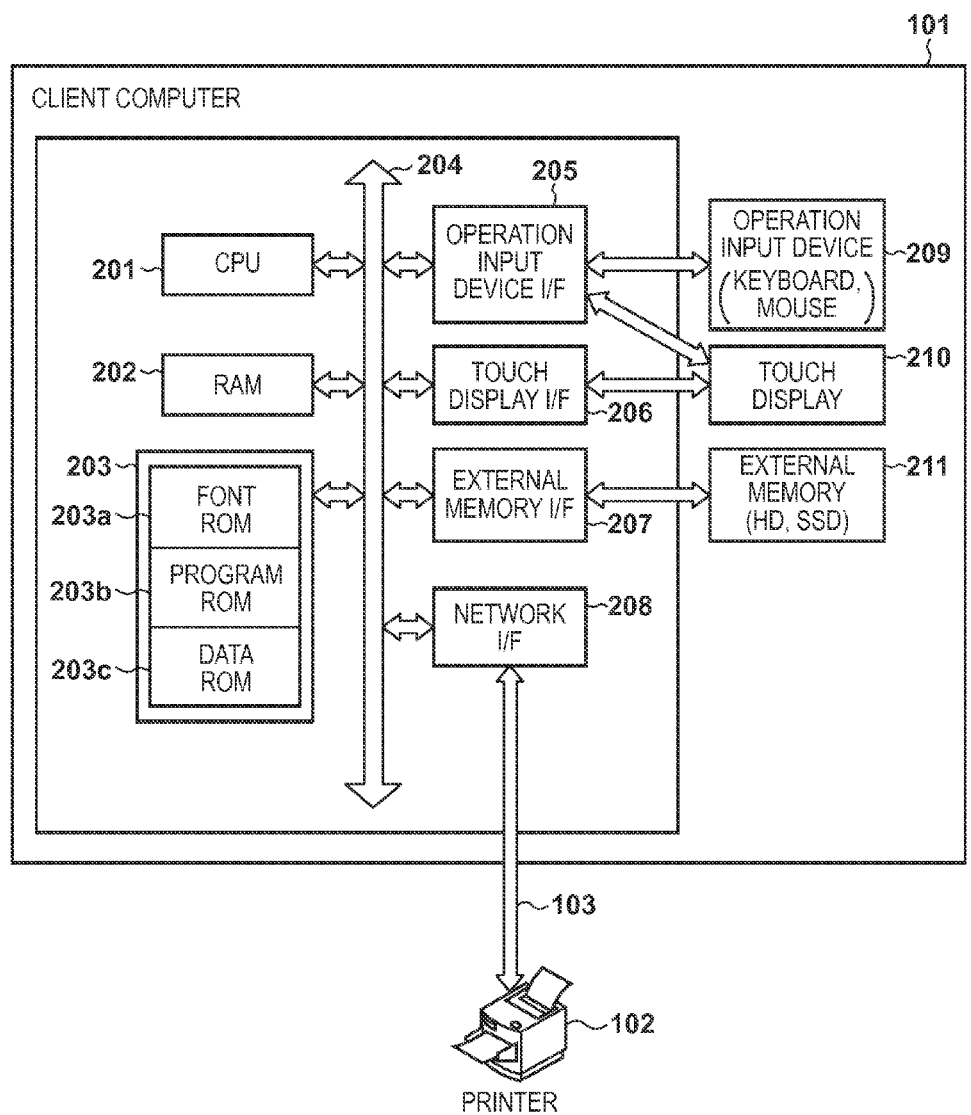
FIG. 2 is a block diagram showing the hardware arrangement of a client computer.

FIG. 2 is a block diagram showing the hardware arrangement of the client computer 101. In the client computer 101, a CPU (Central Processing Unit) 201 controls devices connected to a system bus 204 in accordance with programs stored in a RAM (Random Access Memory) 202. Note that the client computer 101 includes at least one CPU.

The RAM 202 functions as the main memory, work area, and the like of the CPU 201. A ROM (Read Only Memory) 203 stores various kinds of programs and data. The ROM 203 is divided into a font ROM 203a that stores various fonts, a program ROM 203b that stores a boot program, a BIOS (Basic Input Output System), and the like, and a data ROM 203c that stores various data.

An operation input device interface (I/F) 205 controls an operation input device 209 such as a keyboard or a pointing device (mouse). A touch display I/F 206 controls screen display on a touch display 210. The touch display 210 transmits an input by a touch operation to the operation input device I/F 205. Note that the following description will be made assuming that the client computer 101 includes the touch display 210. However, the client computer 101 may includes a display that does not support a touch operation.

An external memory I/F 207 controls access to an external memory 211 such as an HD (Hard Disk) or an SSD (Solid State Drive). The external memory 211 functions as a computer-readable storage medium that stores various applications, various files, and the like, including an OS (Operating System). The external memory 211 also records programs associated with print processing to be described below. A network I/F 208 is connected to the printer 102 via the network 103 and performs communication control processing with respect to the printer 102.

Figure 3:
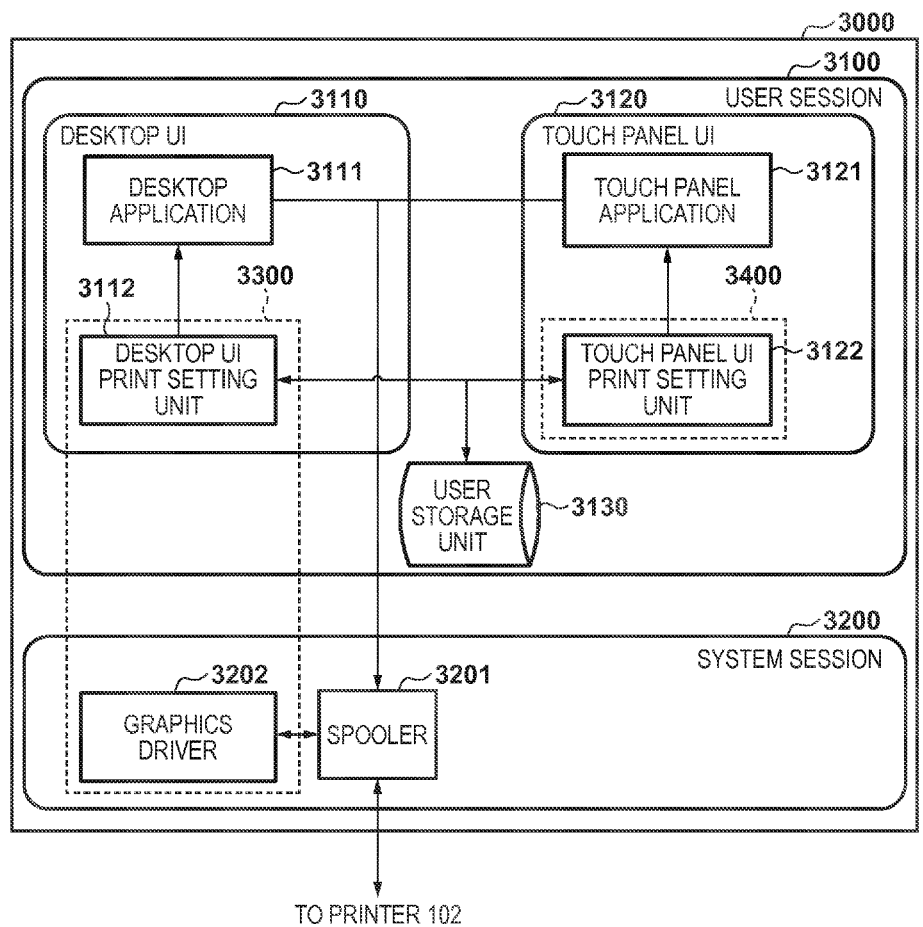
FIG. 3 is a block diagram showing the software module arrangement of the client computer.

FIG. 3 is a block diagram showing the software module arrangement of the client computer 101. In particular, FIG. 3 shows a functional block diagram in an OS 3000 operating on the client computer 101. Programs that implement the functional modules shown in FIG. 3 are stored in the external memory 211. The programs are loaded to the RAM 202 as needed and executed by the CPU 201 on the client computer 101.

The OS 3000 introduces a concept "session" to support login of a plurality of users. "Session" is the concept of the connection state of a screen, keyboard, process space, and the like prepared for each user. There are two types of sessions. One is a user session 3100 assigned for each user, and the other is a system session 3200 that is a special session assigned to an operation of the OS. In general, the user session 3100 and the system session 3200 are separated in consideration of security.

Information of each login user is managed by the user session 3100. The user session 3100 is generated when a user has logged in to the system and ends when the user has logged out.

When the user session 3100 starts, two user interface environments (UI environments) are generated. A desktop UI environment 3110 suitable for a mouse operation and a touch panel UI environment 3120 suitable for a touch operation will be explained here as examples of the two UI environments. Note that the desktop UI environment 3110 is provided by a platform for a desktop UI environment, and the touch panel UI environment 3120 is provided by a platform for a touch panel UI environment.

The touch display 210 exclusively displays one of the screens of the two UI environments and never displays them simultaneously. In each UI environment, only applications of architecture specialized to the environment can operate. Hence, a desktop application created for the desktop UI environment does not operate in the touch panel UI environment. A touch panel application created for the touch panel UI environment does not operate in the desktop UI environment. For this reason, to use an application of a UI environment different from a UI environment currently displayed, the user needs to switch the UI environment to operate.

In the desktop UI environment 3110, various desktop applications 3111 such as a document composition application and a WEB browser operate. In addition, a desktop UI print setting unit 3112 is installed for print setting of the printer 102.

In the touch panel UI environment 3120, various touch panel applications 3121 such as mail software and a WEB browser operate. In addition, a touch panel UI print setting unit 3122 is installed for print setting of the printer 102.

The user session 3100 also includes a user storage unit 3130 accessible from both the desktop UI print setting unit 3112 and the touch panel UI print setting unit 3122.

The system session 3200 is the session of the system independent of the user. The system session 3200 is generated at the time of activation of the OS 3000 and ends when the OS 3000 has ended. In the system session 3200, a service that forms the basis of the OS 3000 independent of the login user operates. A spooler 3201 operates as a service of print related processing. The spooler 3201 receives rendering data and print setting information from the desktop application 3111 or the touch panel application 3121. A graphics driver 3202 corresponding to the printer 102 of the output destination generates print data (data described in PDL) based on the rendering data and the print setting information. After that, the spooler 3201 transmits the generated print data to the printer 102 via the network 103. As a result, the printer 102 executes printing.

The graphics driver 3202 and the desktop UI print setting unit 3112 enclosed in a dotted frame 3300 are provided as printer drivers by a hardware vendor that develops the printer 102. For example, the printer drivers are installed in the OS 3000 when setting the printer 102.

The touch panel UI print setting unit 3122 enclosed in a dotted frame 3400 is also developed and provided by the hardware vendor that develops the printer 102. The touch panel UI print setting unit 3122 is an application that provides a print setting UI corresponding to a printer driver operating in the touch panel UI environment.

Applications that operate in the touch panel UI environment 3120 are collectively managed on an external server to augment security and quality. The applications are distributed from the external server via the network 103 and provided to the client computer. The touch panel UI print setting unit 3122 is a kind of application that operates in the touch panel UI environment 3120. Hence, the touch panel UI print setting unit 3122 is automatically downloaded to the client computer 101 and installed in the system in synchronism with installation of the printer driver.

Note that only one of the desktop UI print setting unit 3112 and the touch panel UI print setting unit 3122 may exist in the OS 3000 depending on the operation setting of the OS 3000 or the installation procedure of the printer driver. For example, if the network 103 is not connected to an external network, the touch panel UI print setting unit 3122 is not distributed from the external server. Hence, only the desktop UI print setting unit 3112 exists.

The desktop UI environment 3110 and the touch panel UI environment 3120 operate in different execution environments. For example, the desktop UI environment 3110 is implemented by the execution environment of Win32, and the touch panel UI environment 3120 is implemented by the execution environment of WinRT. The user storage unit 3130 is a storage area accessible from both execution environments.

FIGS. 4A to 4D are views exemplarily showing the screen of the print setting UI in the desktop UI environment 3110, which is displayed on the touch display 210. The basic UI operation procedure of printing from the desktop application 3111 will be described below with reference to FIGS. 4A to 4D.

In the desktop UI environment 3110, the desktop application 3111 operates, as shown in FIG. 3. FIG. 4A is a view showing an example in which the desktop application 3111 is displayed on the desktop UI environment 3110. In the desktop UI environment 3110, a display space called a desktop 4000 is displayed all over the touch display 210. The desktop application 3111 is displayed in a unique region called a window 4001 for the desktop application. Since the menu and the like of the desktop application are displayed in each window 4001, a plurality of desktop applications 3111 can simultaneously be displayed on the desktop 4000.

The display content of the application and tabs 4002 and menu items 4003 for operations are displayed on the window 4001. The desktop application 3111 receives input from the touch display 210 or the operation input device 209 and operates.

To print from the desktop application 3111, the desktop application 3111 receives user's selection of the "print" item 4003 from the pull-down menu of the "file" tab 4002. The desktop application 3111 then displays a print dialogue 4100 shown in FIG. 4B. A printer name button 4101 used to select an output destination printer, an advanced setting button 4102 used to do advanced print setting for the selected printer, and a print button 4103 used to receive print execution are arranged in the print dialogue 4100. When the advanced setting button 4102 is selected, the desktop application 3111 requests the OS 3000 to do advanced print setting for the printer selected by the printer name button 4101. Upon receiving the request, the OS 3000 displays a print setting UI (print setting screen) of the desktop UI print setting unit 3112 corresponding to the selected printer.

Figure 4C:
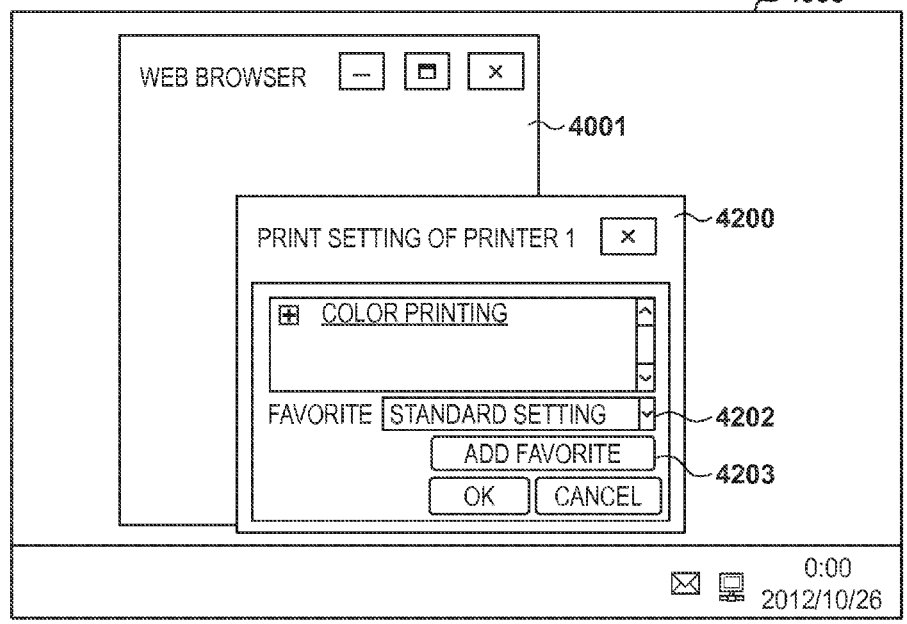

FIG. 4C is a view showing a print setting UI 4200 of the desktop UI print setting unit 3112. The desktop UI print setting unit 3112 is a module that performs processing of print setting for the printer 102. In the print setting UI 4200, detailed print setting information concerning printing for the printer 102 can be set. The print setting UI 4200 includes a print setting item group 4201 and an OK button 4204 used to determine print setting. The print setting item group 4201 displays current print settings such as color printing and single/double-sided printing used in the printer 102, and also receives a change of print setting from the user.

Figure 4D:
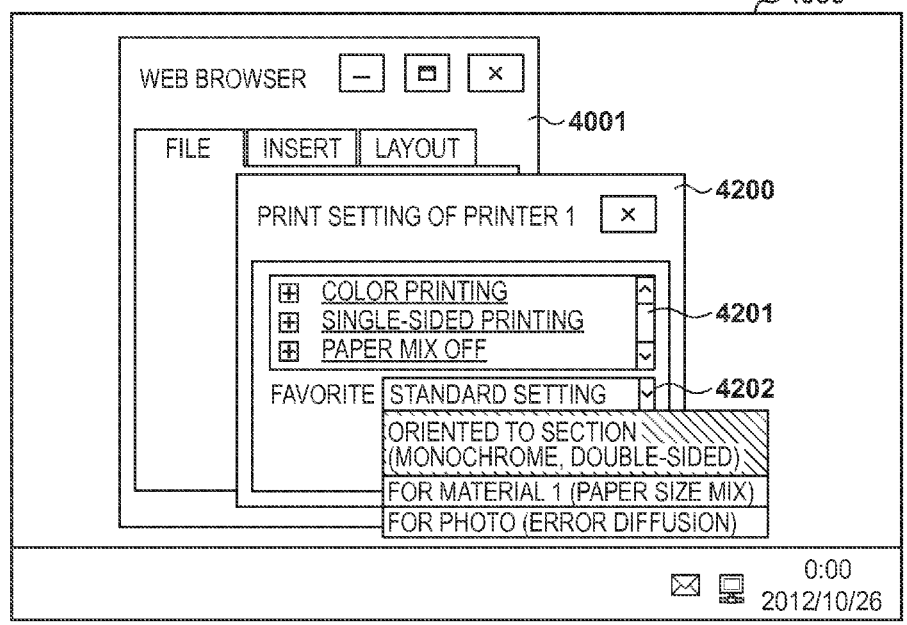

The print setting UI 4200 also includes a favorite setting name list 4202 and a favorite addition button 4203. Note that a favorite is a set of set values of a plurality of print setting items. FIG. 4D is a view showing a state in which the favorite setting name list 4202 that is a list of favorites is clicked. When the favorite setting name list 4202 is clicked, the desktop UI print setting unit 3112 displays, as choices, a favorite name list including a favorite added in a state in which an option 7005 to add to the desktop UI shown in FIG. 7 (to be described later) is enabled. When one favorite name (identifier) on the name list is selected, the desktop UI print setting unit 3112 reflects print settings associated with the selected favorite name on the print setting item group 4201. In addition, the desktop UI print setting unit 3112 displays the selected favorite name in the favorite setting name list 4202 and returns to the display state shown in FIG. 4C. After that, when the OK button 4204 is pressed, the print setting UI 4200 returns the print setting item group 4201 to the OS 3000 as the current print setting. Then, the print setting UI 4200 shown in FIG. 4C is closed. That is, the favorite setting can easily be set. When the print button 4103 of the print dialogue 4100 is pressed (that is, when a print instruction is input), processing of generating print data is executed.

FIGS. 5A to 5F are views exemplarily showing the screen of the print setting UI in the touch panel UI environment 3120, which is displayed on the touch display 210. The basic UI operation procedure of printing from the touch panel application 3121 will be described below with reference to FIGS. 5A to 5F.

In the touch panel UI environment 3120, the UI is designed while placing importance on operations on the touch display 210. To facilitate a touch operation by a finger, a pen (stylus), or the like, the operation menu is formed from buttons larger than those provided in the desktop UI environment. Although an input from the operation input device 209 such as a mouse or a keyboard is also received in the touch panel UI environment 3120, an operation on the touch display 210 will be described below. On the touch panel UI environment 3120, the touch panel application 3121 operates, as shown in FIG. 3.

FIG. 5A is a view showing a start screen 5001 of the touch panel UI environment 3120. The start screen 5001 is displayed all over a touch panel UI 5000. The touch panel applications 3121 are displayed on the start screen 5001 in the form of tiles 5002 to 5005. When the user taps a tile, the touch panel application 3121 corresponding to the tile is displayed all over the touch panel UI 5000.

Figure 5C:
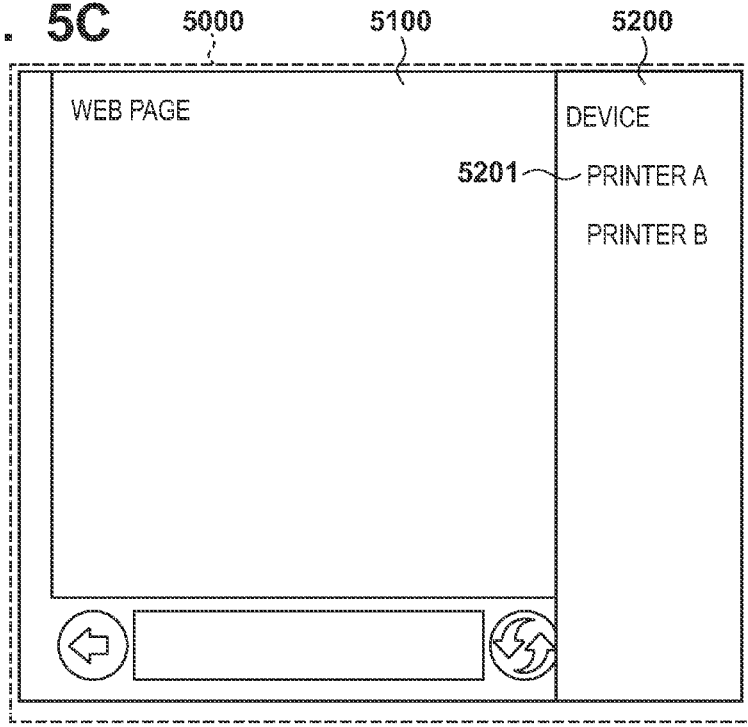

FIG. 5B is a view showing a display example of a WEB browser 5100. The WEB browser 5100 is displayed all over the touch panel UI 5000, and any other application is not displayed. To do printing from the touch panel application 3121, the user touches the right end of the touch display 210 and slides the finger, thereby displaying a printer select menu 5200 shown in FIG. 5C to select the printer of the print output destination. Print output destination candidates are listed in the printer select menu 5200. When the user taps a "printer A" 5201 as one of the candidates, a basic print setting UI 5300 shown in FIG. 5D, which is provided by the OS 3000, is displayed. In the basic print setting UI 5300, basic print setting information such as "copies" and "color mode" can be set.

Figure 5D:
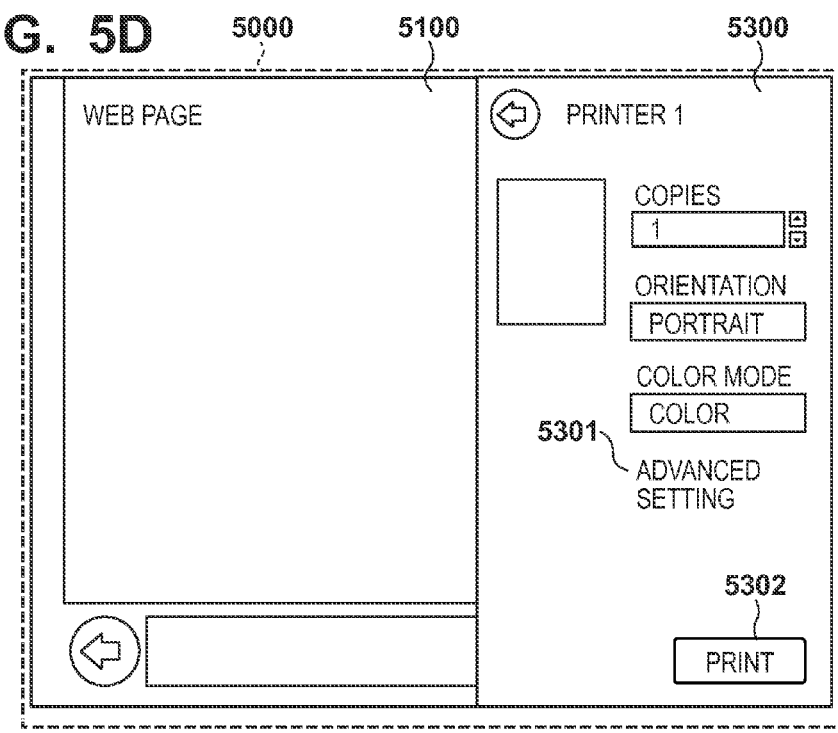
Figure 5E:
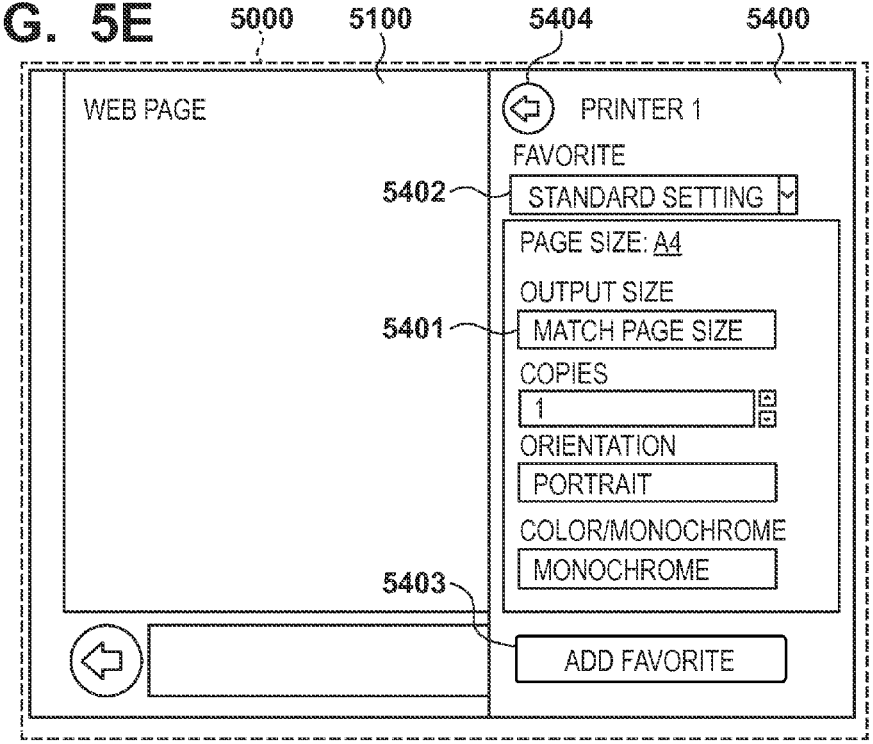

When advanced setting 5301 is pressed, a print setting UI 5400 of the touch panel UI print setting unit 3122 shown in FIG. 5E is displayed. The touch panel UI print setting unit 3122 is a module that performs processing of print setting for the printer 102. In the print setting UI 5400, detailed print setting information concerning printing for the printer 102 can be set by operating a print setting group 5401.

Figure 5F:
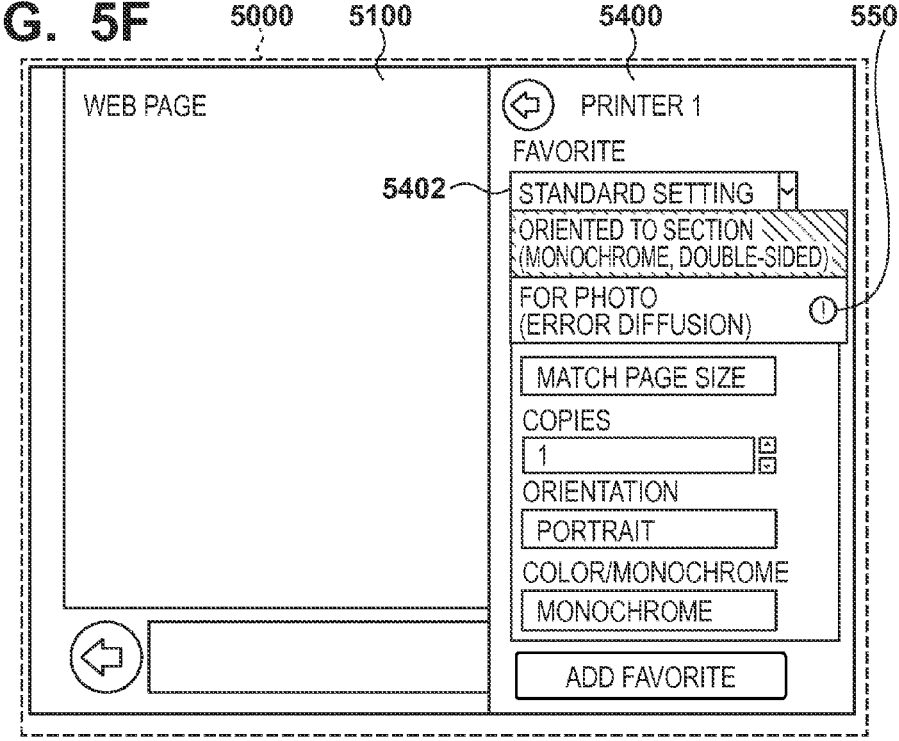

The print setting UI 5400 also includes a favorite setting name list 5402 and a favorite addition button 5403. FIG. 5F is a view showing a state in which the favorite setting name list 5402 is clicked. The touch panel UI print setting unit 3122 obtains a list of currently stored favorites, including a favorite added by the desktop UI print setting unit 3112 in step S905 of FIG. 9A (to be described later). The touch panel UI print setting unit 3122 displays the favorite setting name list 5402 as choices. When the favorite setting name list 5402 is clicked, the touch panel UI print setting unit 3122 displays the favorite name list. When one favorite name on the name list is selected, the touch panel UI print setting unit 3122 reflects print settings associated with the selected favorite name on the print setting group 5401. In addition, the touch panel UI print setting unit 3122 displays the selected favorite name in the favorite setting name list 5402 and returns to the display state shown in FIG. 5E. After that, when a "return" button 5404 is pressed, the display state shown in FIG. 5D is obtained. When a print button 5302 is pressed (that is, when a print instruction is input), processing of generating print data is executed.

Figure 6:
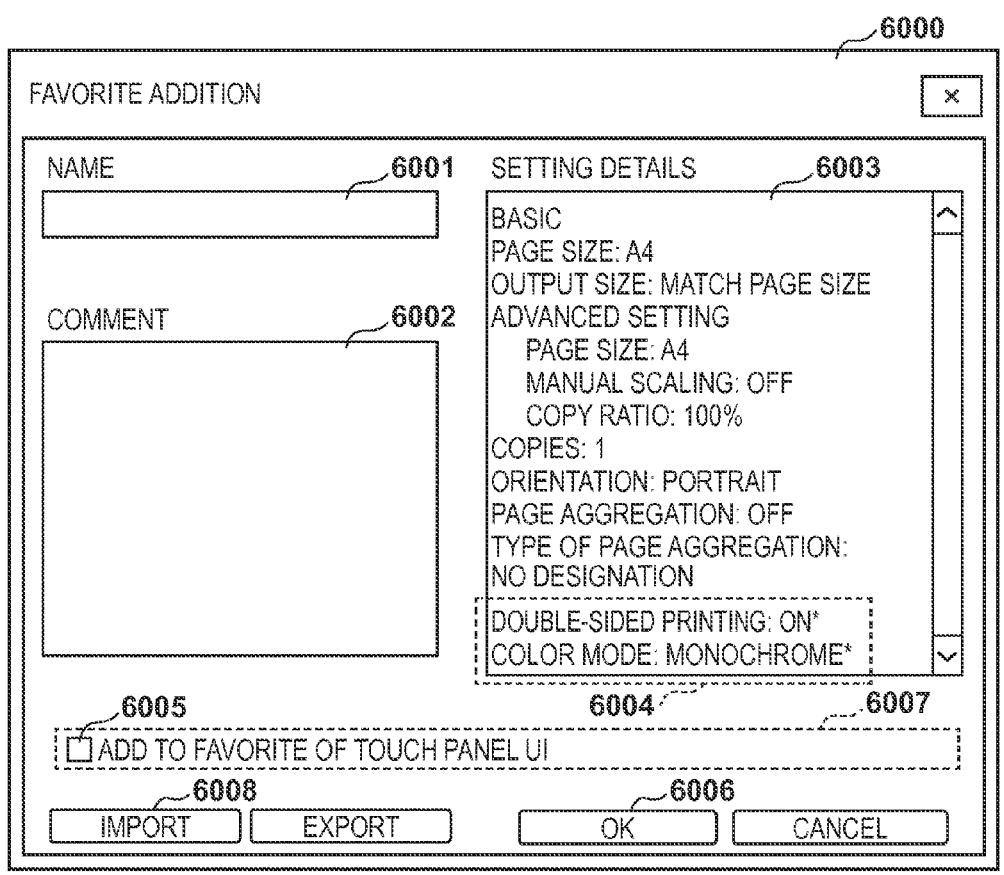
FIG. 6 is a view exemplarily showing a favorite addition screen in the desktop UI environment.

FIG. 6 is a view exemplarily showing a favorite addition screen 6000 in the desktop UI environment, which is displayed on the touch display 210. The favorite addition screen 6000 is displayed by the desktop UI print setting unit 3112 when the favorite addition button 4203 shown in FIG. 4C is pressed. The favorite addition screen 6000 includes a name edit box 6001 to give a name (identifier) to a favorite print setting, and a comment edit box 6002 to further add a description. A list box 6003 of setting details displays a current print setting item group (one set of set values) set in the desktop UI print setting unit 3112. Out of the current print setting item group, settings different from the initial print settings (initial set values) of the printer driver are displayed with "*" added to the set values, as indicated by 6004. The print setting group with "*" is the favorite setting target. Favorite setting target extraction processing will be described later with reference to FIG. 9B.

When a name is input to the name edit box 6001, and an OK button 6006 is then pressed, the desktop UI print setting unit 3112 stores the favorite setting in the user storage unit 3130.

Figure 7:
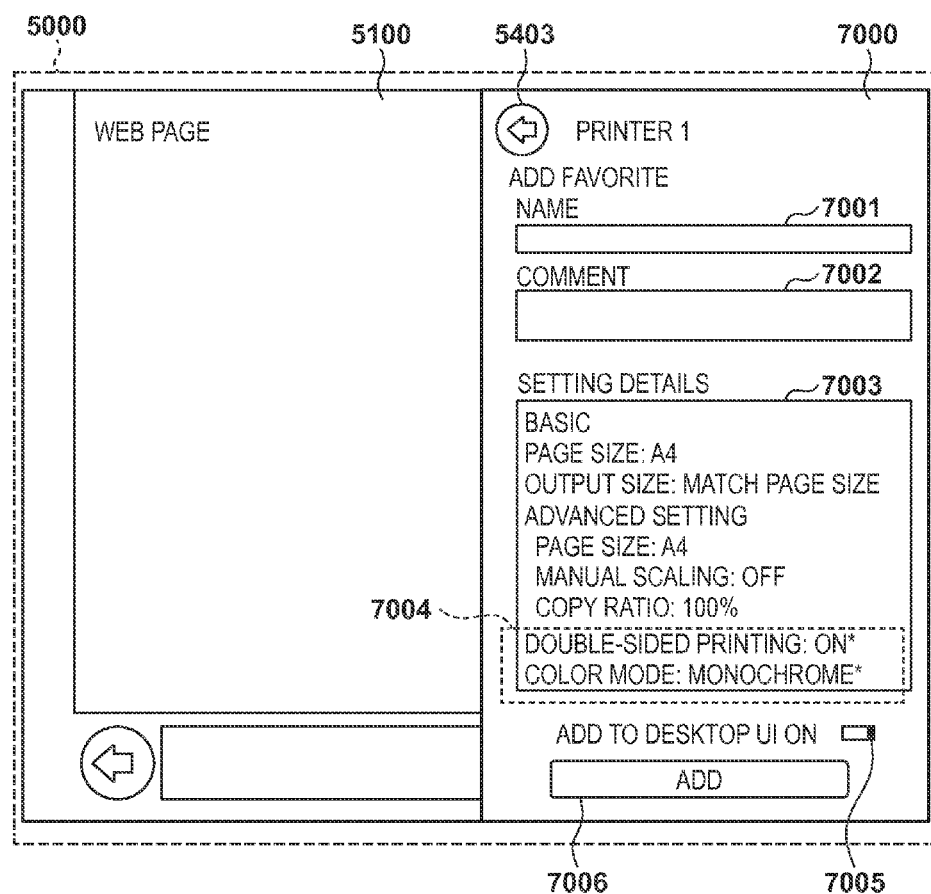
FIG. 7 is a view exemplarily showing a favorite addition screen in the touch panel UI environment.

FIG. 7 is a view exemplarily showing a favorite addition screen 7000 in the touch panel UI environment, which is displayed on the touch display 210. The favorite addition screen 7000 is displayed by the touch panel UI print setting unit 3122 when the favorite addition button 5403 shown in FIG. 5E is pressed. The favorite addition screen 7000 includes a name edit box 7001 to give a name to a favorite print setting, and a comment edit box 7002 to further add a description. A list box 7003 of setting details displays a current print setting item group set in the touch panel UI print setting unit 3122. Out of the current print setting item group, settings different from the initial print settings of the printer driver are displayed with "*" added to the set values, as indicated by 7004. The print setting group with "*" is the favorite setting target. When a name is input to the name edit box 7001, and an "add" button 7006 is then pressed, the touch panel UI print setting unit 3122 stores the favorite setting (one set of set values) in the user storage unit 3130 in association with the name (identifier) (storage control unit).

Figure 8:
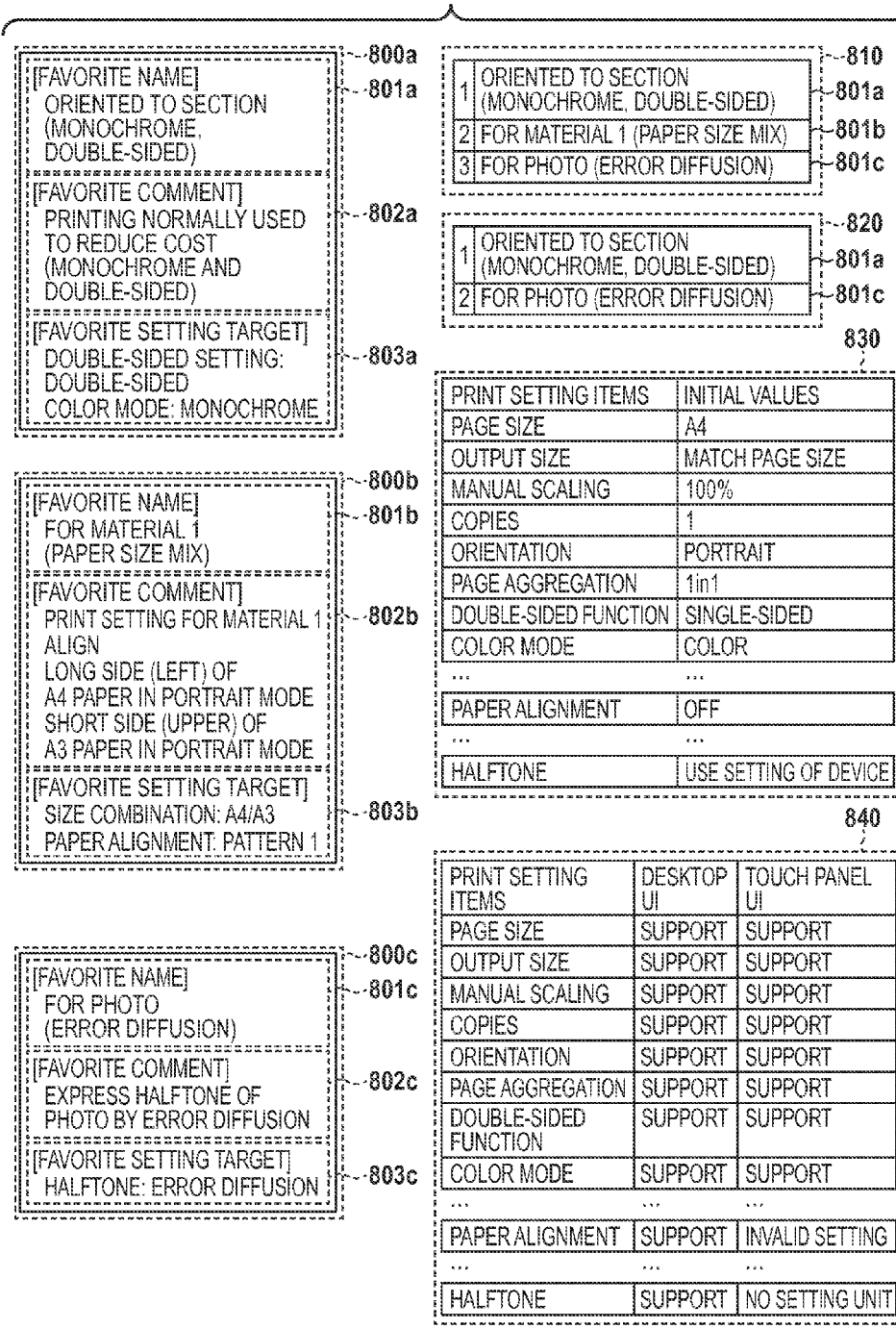
FIG. 8 is a view exemplarily showing the structure of each data related to favorite setting.

FIG. 8 is a view exemplarily showing the structure of each data related to favorite setting. Setting data 800a to 800c (to be representatively referred to as setting data 800 hereinafter) indicate examples of setting data of favorite setting. Each setting data 800 includes a favorite name 801, a favorite setting comment 802, and a favorite setting target 803. These pieces of information are generated based on input information to the favorite addition screen 6000 of the desktop UI environment shown in FIG. 6 or the favorite addition screen 7000 of the touch panel UI environment shown in FIG. 7.

The favorite name 801 is generated based on the name of favorite print setting input to the name edit box 6001 or 7001. The favorite setting comment 802 is generated based on a character string input to the comment edit box 6002 or 7002. The favorite setting target 803 is the list of print setting items different from the initial print settings of the printer driver out of the current print setting item group and the set values of the print setting items. A generation method will be described later with reference to the flowchart of favorite setting target extraction processing shown in FIG. 9B. The setting data 800 is stored by the desktop UI print setting unit 3112 and the touch panel UI print setting unit 3122 in the user storage unit 3130 accessible from both.

Favorite setting name lists 810 and 820 are formed from the favorite names 801 of the setting data 800. The favorite setting name list 810 is an example of the favorite setting name list of the desktop UI print setting unit 3112. Based on this information, the desktop UI print setting unit 3112 displays the favorite setting name list 4202 shown in FIG. 4D. On the other hand, the favorite setting name list 820 is an example of the favorite setting name list of the touch panel UI print setting unit 3122. Based on this information, the touch panel UI print setting unit 3122 displays the favorite setting name list 5402 shown in FIG. 5F.

Figure 9A:
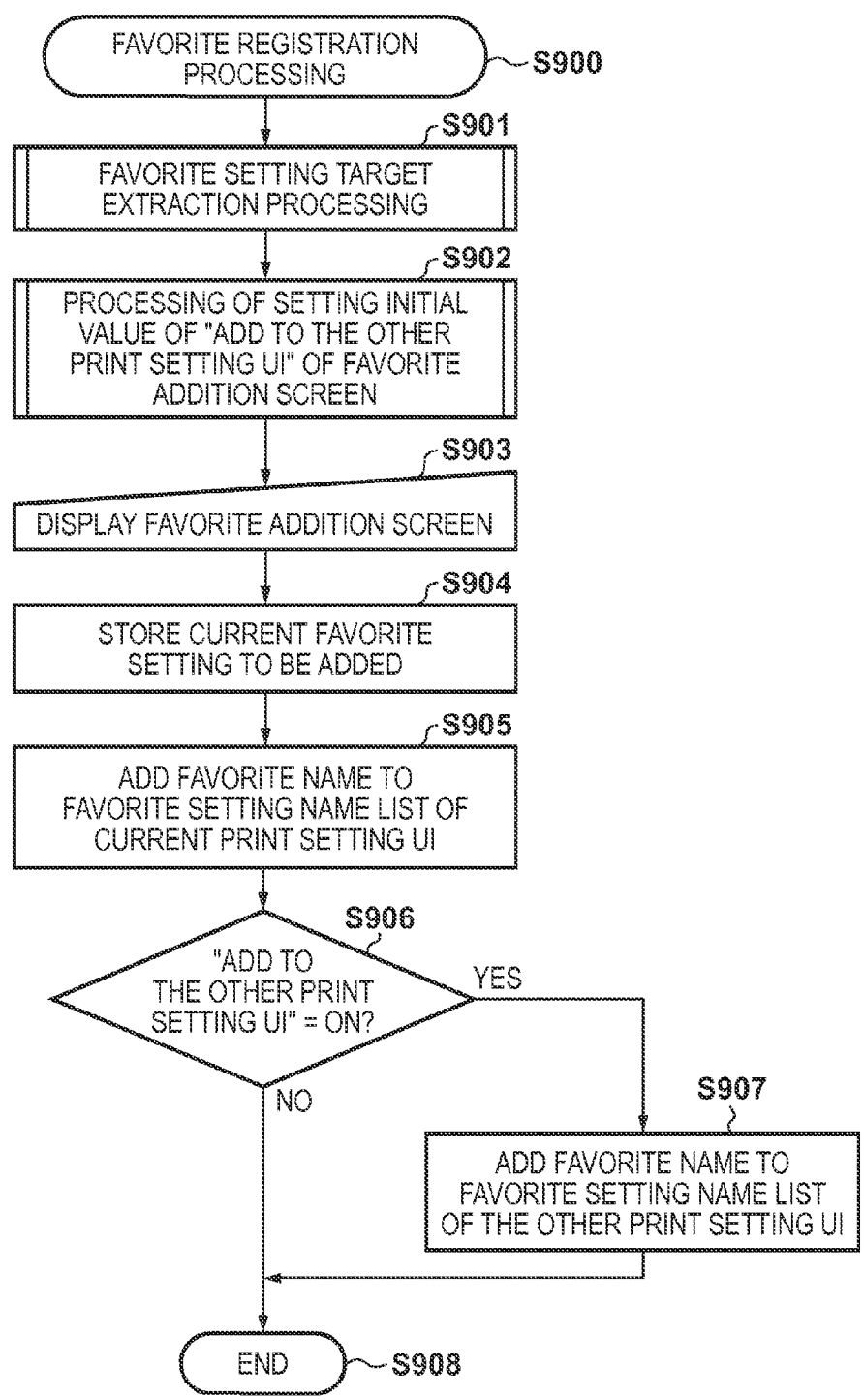
FIGS. 9A to 9C are flowcharts of favorite registration processing according to the first embodiment.
Figure 9B:
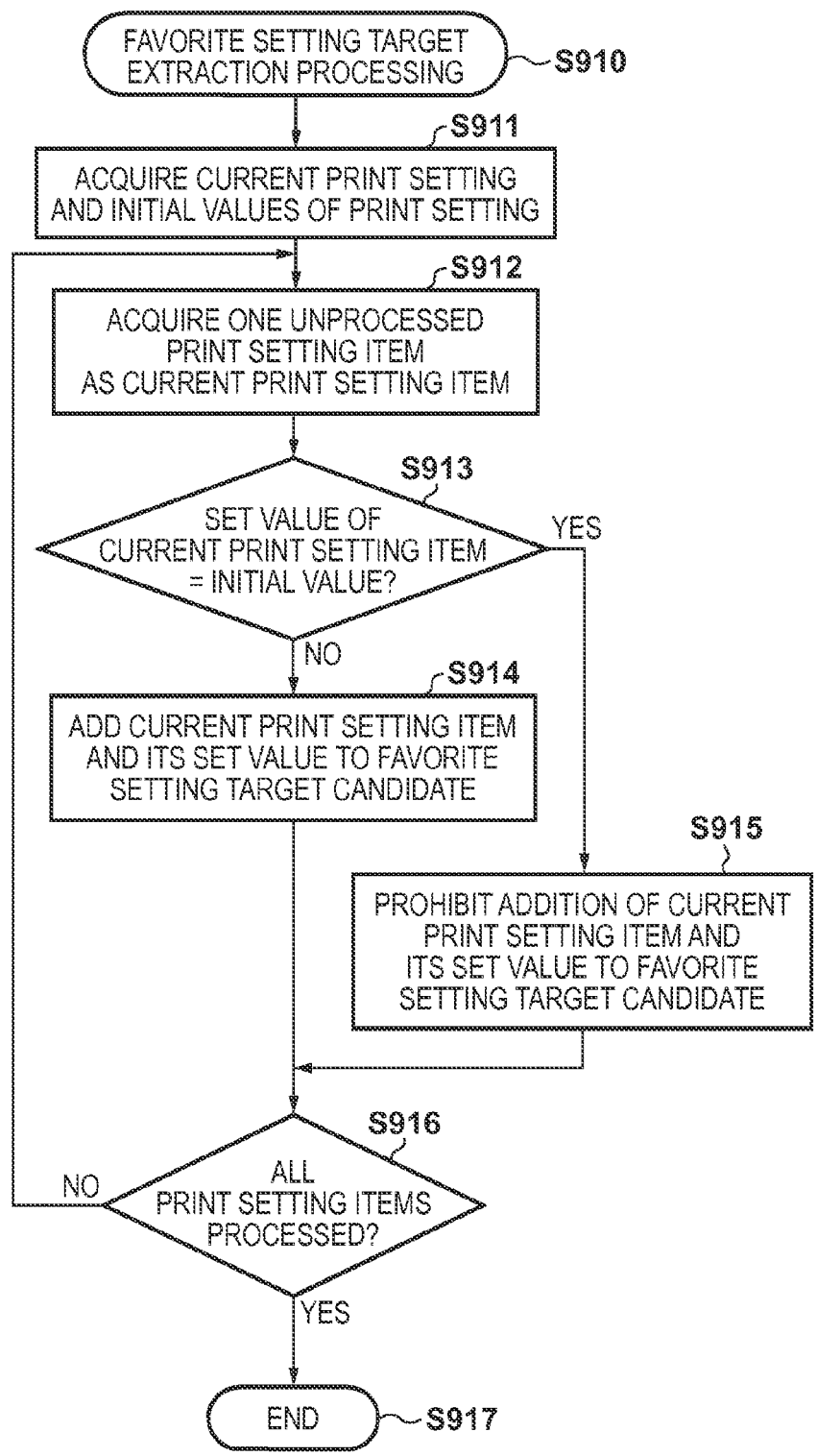
Figure 9C:
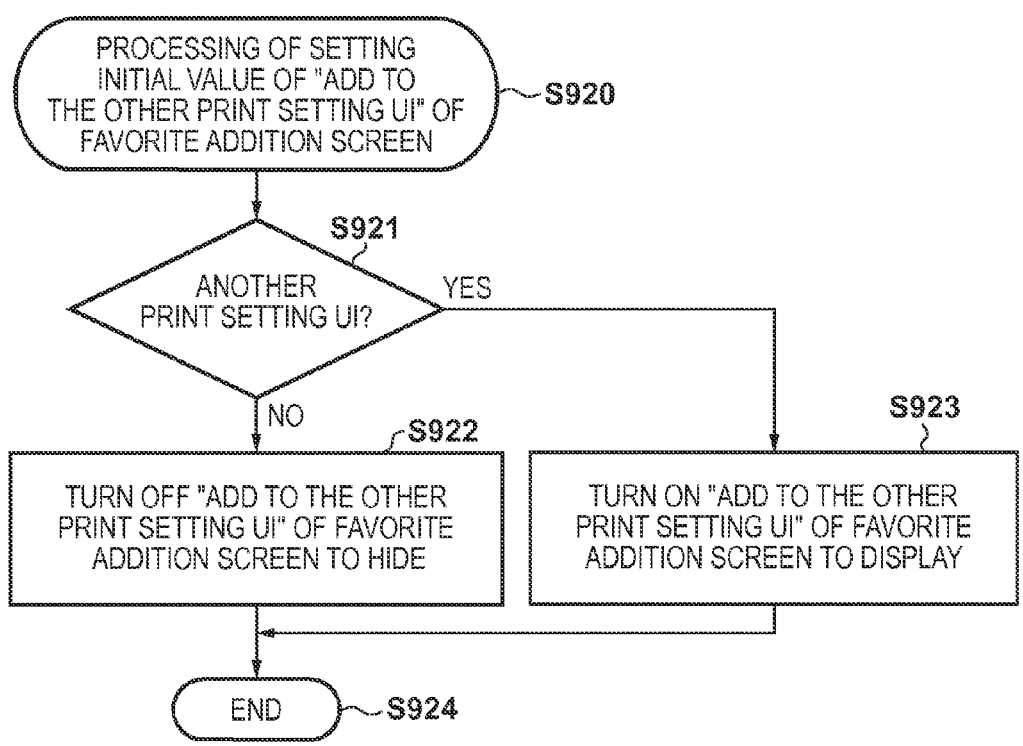

FIGS. 9A to 9C are flowcharts of favorite registration processing of the information processing apparatus according to the first embodiment. Favorite registration processing will be described below with reference to the flowcharts of FIGS. 9A to 9C. Note that the favorite registration processing is executed when, for example, the favorite addition button 4203 of the print setting UI 4200 is pressed. The subject of the processing of the flowcharts is the desktop UI print setting unit 3112, unless otherwise specified.

In step S901, the desktop UI print setting unit 3112 performs processing of extracting the favorite setting target 803 from current print setting. FIG. 9B is a flowchart showing details of the extraction processing. First, the desktop UI print setting unit 3112 obtains the current print setting designated in the print setting item group 4201 and a print setting initial value group 830 (step S911). The print setting initial value group 830 holds the initial values of print setting items settable in the print setting item group 4201. The desktop UI print setting unit 3112 also extracts the print setting items from the current print setting one by one, and sets them as current print setting items (step S912).

After that, it is determined whether the current print settings have the same values as the corresponding initial values in the print setting initial value group 830 (step S913). If the values are different, the current print setting items and their set values are added as favorite setting target candidates (step S914). If the values are the same, the current print setting items and their set values are not added as favorite setting target candidates (step S915). The processes of steps S912 to S915 are repeated for all print setting items of the current print setting (step S912). If all print setting items are processed, the extraction processing ends (step S917).

In step S902, the desktop UI print setting unit 3112 performs initial value setting processing for "add to the other print setting UI" of the favorite addition screen. In other words, this is processing of setting permission/prohibition of use (usable or unusable) by the touch panel UI print setting unit 3122. In the favorite addition screen 6000 of the desktop UI environment, processing of setting the initial value of an "add to favorite of touch panel UI" check box 6005 is performed.

FIG. 9C is a detailed flowchart for explaining the processing of setting the initial value of the check box 6005. First, the desktop UI print setting unit 3112 determines whether the touch panel UI print setting unit 3122 that is the other print setting UI exists (step S921). If the touch panel UI print setting unit 3122 does not exist, the favorite setting need not be registered in the touch panel UI print setting unit 3122. For this reason, the "add to the other print setting UI" check box 6005 is turned off to set an initial value to hide (step S922). If the touch panel UI print setting unit 3122 exists, the check box 6005 used to register the favorite setting in the touch panel UI print setting unit 3122 is turned on to set an initial value to display (step S923). After that, the process advances to step S924 to end the processing of setting the initial value of "add to the other print setting UI" in the favorite addition screen.

In step S903, the desktop UI print setting unit 3112 displays the favorite addition screen 6000 and waits for input to the UI. The check box 6005 of the favorite addition screen 6000 has the state determined by the initial value setting processing (FIG. 9C). If the check box 6005 is displayed, on/off setting is received. When the OK button 6006 is pressed after input to the name edit box 6001, the desktop UI print setting unit 3112 generates the setting data 800 and stores it in the user storage unit 3130 in step S904.

In step S905, the desktop UI print setting unit 3112 adds the favorite name input to the name edit box 6001 to the favorite setting name list 810 for the desktop UI print setting unit 3112.

In step S906, the desktop UI print setting unit 3112 determines the state of the check box 6005 of the favorite addition screen 6000. If the check box 6005 is on, the desktop UI print setting unit 3112 adds the favorite name input to the name edit box 6001 to the favorite setting name list 820 for the touch panel UI print setting unit 3122 in step S907. After that, the favorite registration processing ends in step S908.

As described above, according to the first embodiment, when registering a favorite print setting in one print setting UI, the favorite print setting is stored in a common storage area that can be accessed from the other print setting UI as well. This arrangement makes it possible to use the favorite print setting in both print setting UIs without necessity of reregistration in the other print setting UI.

Note that processing performed when the favorite addition button 4203 in the print setting UI 4200 of the desktop UI print setting unit 3112 is pressed has been described above. However, when the favorite addition button 5403 in the print setting UI 5400 of the touch panel UI print setting unit 3122 is pressed, favorite registration processing may be performed by the same processing as described above.

Second Embodiment

In the second embodiment, processing performed when favorite setting in one print setting UI is invalid in the other print setting UI will be described.

An example of favorite setting invalid in the other print setting UI will be explained first. Some desktop applications 3111 can change the output size or orientation on a page basis when printing a document including a plurality of pages. To cope with printing from such an application, a desktop UI print setting unit 3112 has print setting about paper alignment as a print setting item.

Figure 13:
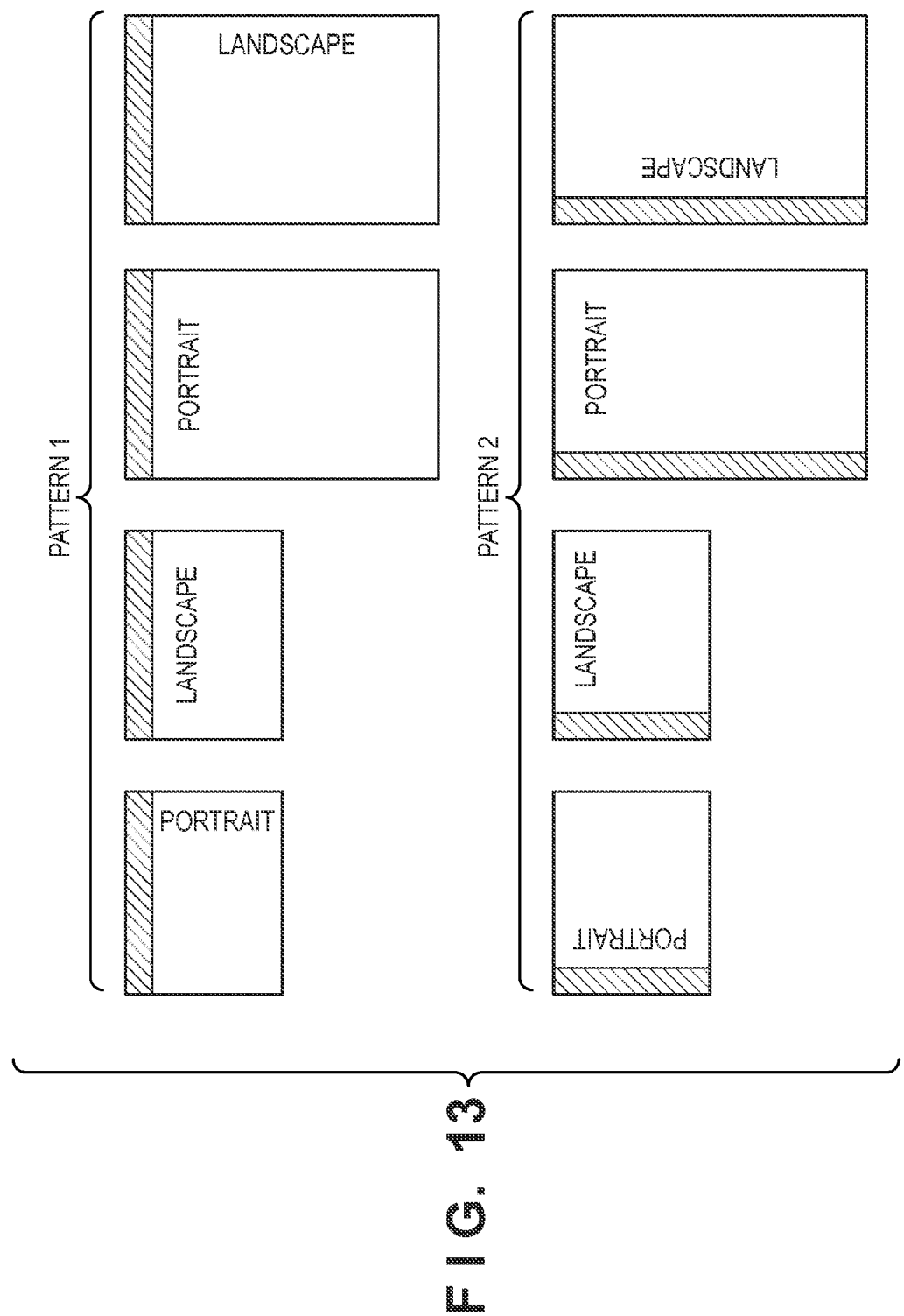
FIG. 13 is a view exemplarily showing paper alignment patterns.

FIG. 13 is a view exemplarily showing "paper alignment" patterns. As shown in FIG. 13, a plurality of paper alignment patterns are defined in advance. A paper alignment position necessary for stapling or the like can be set by designating a pattern as the set value of print setting about paper alignment.

On the other hand, there exists no touch panel application 3121 capable of changing the output size or orientation on a page basis when printing a document including a plurality of pages. Hence, a print setting UI 5400 of a touch panel UI print setting unit 3122 has no print setting item about the paper alignment position in a print setting group 5401. For this reason, favorite setting including only print setting items of paper alignment as a favorite setting target is invalid in the touch panel UI print setting unit 3122.

Figure 11:
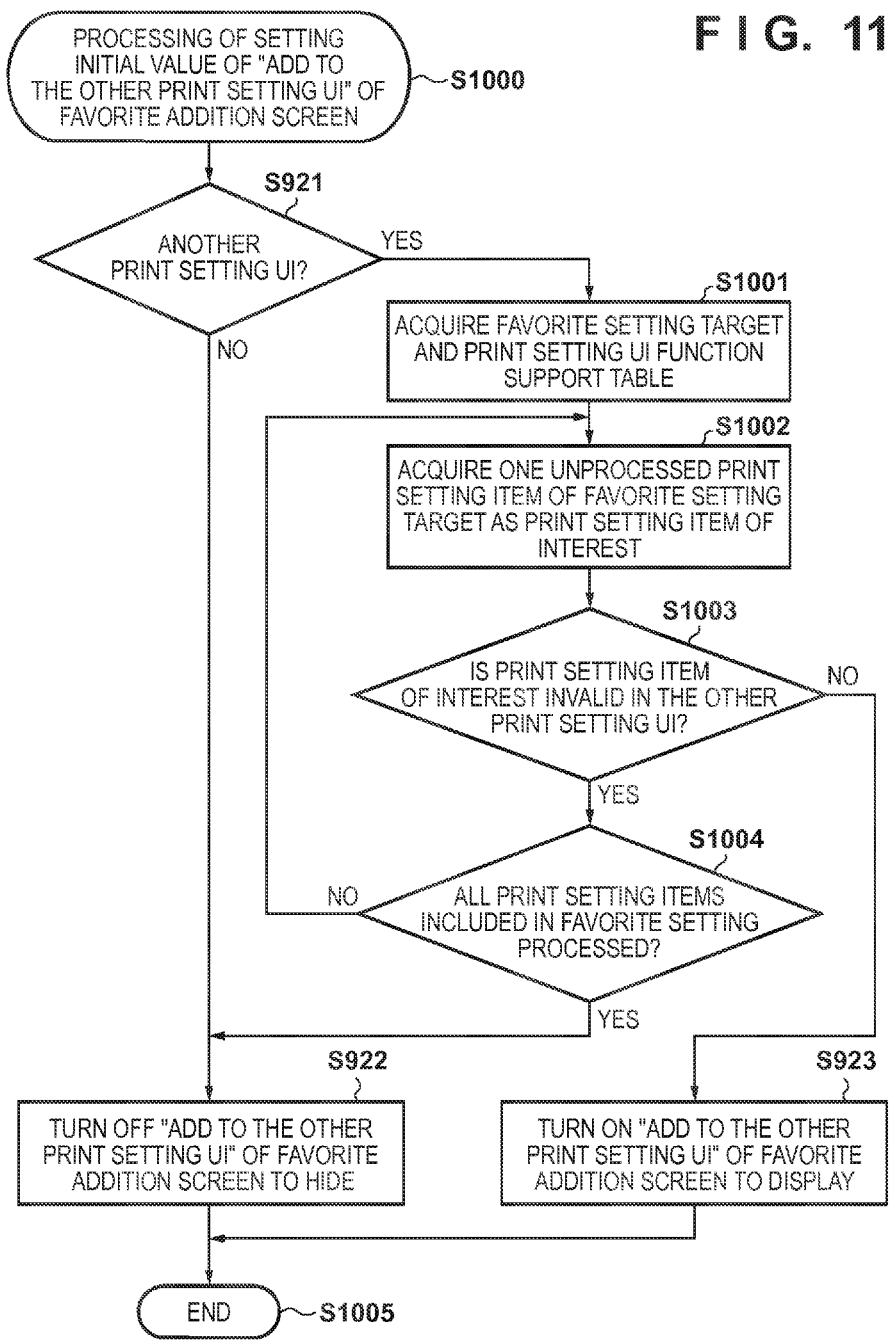
FIG. 11 is a flowchart of favorite registration processing according to the second embodiment.

FIG. 11 is a flowchart of favorite registration processing of the information processing apparatus according to the second embodiment. More specifically, FIG. 11 is a detailed flowchart of processing of setting the initial value of "add to the other print setting UI" in the favorite addition screen in step S902 of FIG. 9A. Note that as in the first embodiment, the subject of the processing of the flowchart is the desktop UI print setting unit 3112, unless otherwise specified.

First, the UI print setting unit 3112 confirms whether the touch panel UI print setting unit 3122 as the other print setting UI exists (step S921). If the touch panel UI print setting unit 3122 does not exist, the favorite setting need not be registered in the touch panel UI print setting unit 3122.

For this reason, an "add to the other print setting UI" check box 6005 is turned off to set an initial value to hide (step S922). If the touch panel UI print setting unit 3122 exists, a current favorite setting target extracted by the favorite setting target extraction processing in step S901 of FIG. 9A and a print setting UI support table are obtained (step S1001).

A print setting UI support table 840 is an example of the print setting UI support table. The print setting UI support table 840 holds information representing whether each print setting item is supported in each of the two print setting UIs. A character string "invalid setting" is entered for an invalid print setting item. Here, since "paper alignment" is invalid in "touch panel UI", "invalid setting" is set in that item. Next, one of unprocessed print setting items of the favorite setting target is obtained as the current print setting item (step S1002). It is determined, using the print setting UI support table 840, whether the current print setting item is invalid setting in the other print setting UI (step S1003). If the current print setting item is invalid setting, the process advances to step S1004. If the current print setting item is not invalid setting, the process advances to step S923.

In step S1004, it is determined whether all print setting items of the favorite setting target are processed. If an unprocessed print setting item still remains, the process returns to step S1002. If all print setting item are processed, the process advances to step S922. When the process advances to step S922, the favorite setting is "invalid favorite setting" including no print setting items valid in the other print setting UI. Hence, the "add to the other print setting UI" check box 6005 is turned off to set an initial value to hide.

If the process advances to step S923, the favorite setting includes at least one valid print setting item as the favorite setting target of the other print setting UI. Hence, the check box 6005 used to register the favorite setting in the touch panel UI print setting unit 3122 is turned on to set an initial value to display. After the process of step S922 or S923, the processing of setting the initial value of "add to the other print setting UI" ends (step S1005).

As described above, according to the second embodiment, it is possible to prohibit favorite setting including only print setting items invalid in the other print setting UI from being registered in the other print setting UI.

Third Embodiment

In general, to improve touch operability, a touch panel UI needs to make UI controls somewhat larger and set the control arrangement interval somewhat wider. That is, the number of controls that can be arranged on the display screen of the touch panel UI is relatively limited. For this reason, the number of setting items that can be designated on the touch panel UI is generally smaller than that on a desktop UI.

This also applies to a print setting UI. As indicated by a print setting UI support table 840, for example, for a print setting item such as halftone, the setting itself is valid. However, halftone is a print setting item that is not displayed in a touch panel UI print setting unit 3122. That is, halftone is a print setting item that cannot undergo setting change by the touch panel UI print setting unit 3122. Such a print setting item will be referred to as a "UI hidden print setting item".

Both the "invalid print setting item" described in the second embodiment and the "UI hidden print setting item" in the third embodiment are print setting items that are not displayed in a print setting group 5401. Hence, when favorite setting is done, it can be assumed that the user will be confused because the print setting items are not reflected on the UI. In the third embodiment, it is determined whether favorite setting includes "invalid print setting items" and "UI hidden print setting items" in the other print setting UI. If such a print setting item is included, the user is notified of it.

Figure 12A:
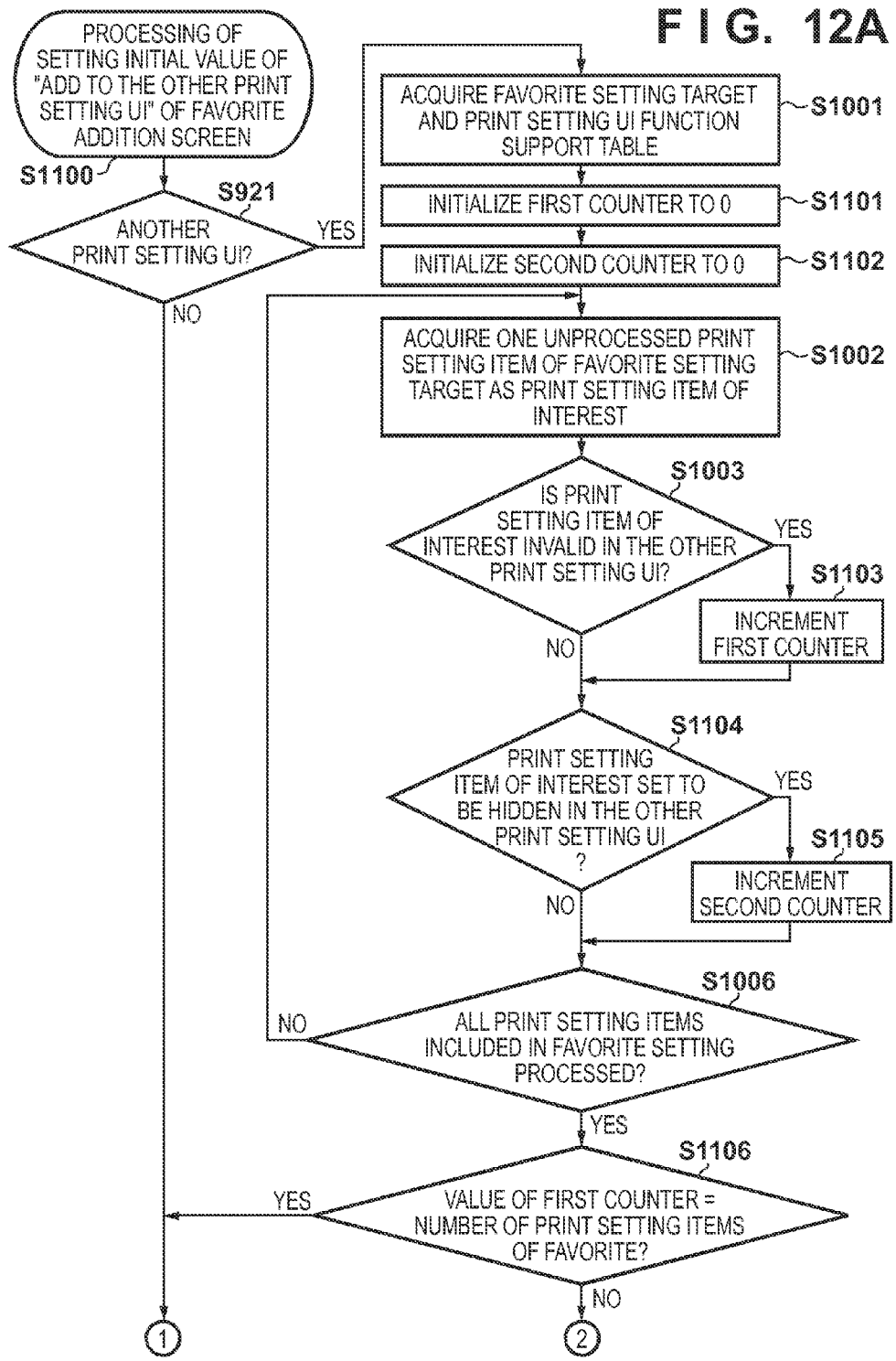
FIGS. 12A and 12B are a flowchart of favorite registration processing according to the third embodiment.
Figure 12B:
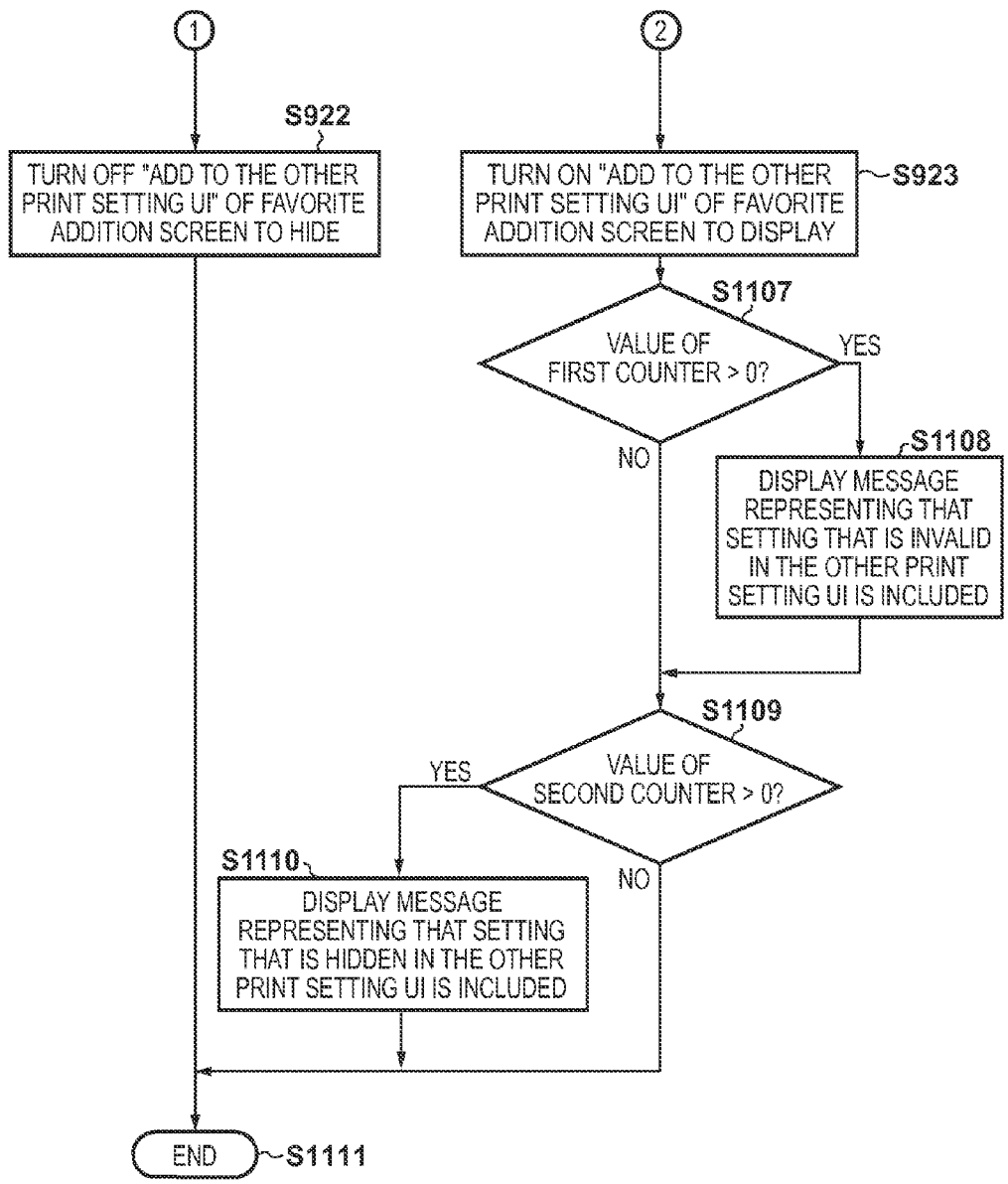

FIG. 12 is a flowchart of favorite registration processing of an information processing apparatus according to the third embodiment. More specifically, FIG. 12 is a flowchart of processing of setting the initial value of "add to the other print setting UI" in the favorite addition screen in step S902 of FIG. 9A. The subject of the processing of the flowchart is a desktop UI print setting unit 3112, unless otherwise specified.

Steps S921, S922, and S1001 of FIG. 12 are the same as in FIG. 11, and a description thereof will be omitted. The desktop UI print setting unit 3112 includes a first counter for invalid setting in the other print setting UI and a second counter for "UI hidden setting". In steps S1101 and S1102, the first counter and the second counter are initialized to 0. In step S1002, one of unprocessed print setting items of the favorite setting target is obtained as the current print setting item. If the current print setting item is an "invalid print setting item" in the other print setting UI, the first counter is incremented (steps S1003 and S1103). If the current print setting item is a "UI hidden print setting item" in the other print setting UI, the second counter is incremented (steps S1104 and S1105). If a print setting item to be obtained as the current print setting item still remains in the favorite setting target in step S1006, the process returns to step S1002. If all print setting items of the favorite setting target are processed, the process advances to step S1106.

In step S1106, it is determined whether the value of the first counter equals the number of print setting items of the favorite. If the value of the first counter equals the number of print setting items, all print setting items of the favorite setting target are "invalid print setting items" in the other print setting UI. In this case, the process advances to step S922, and an "add to the other print setting UI" check box 6005 is turned off to set an initial value to hide. If the value of the first counter is different from the number of print setting items, the check box 6005 used to register the favorite setting in the touch panel UI print setting unit 3122 is turned on to set an initial value to display (step S923).

Next, the desktop UI print setting unit 3112 determines whether the value of the first counter is larger than "0" (step S1107). If the value of the first counter is larger than "0" (1 or more), a message for explaining that the favorite setting includes a print setting item invalid in the other print setting UI is displayed (step S1108). In addition, the desktop UI print setting unit 3112 determines whether the value of the second counter is larger than "0" (step S1109). If the value of the second counter is larger than "0" (1 or more), a message for explaining that the favorite setting includes a print setting item hidden (incapable of setting change) in the other print setting UI is displayed (step S1110). After that, the processing of setting the initial value of "add to the other print setting UI" ends.

Note that as the method of displaying the message in step S1108 or S1110, the message can be displayed in another UI such as a popup screen or in a specific region 6007 of a favorite addition screen 6000 shown in FIG. 6 together. Alternatively, as indicated by 5500 in FIG. 5F, a specific icon may be provided beside the favorite name in a favorite setting name list 5402, and a message may be displayed when the icon is held down.

As described above, according to the third embodiment, a message is displayed when the favorite setting to be registered includes "invalid print setting items" and "UI hidden print setting items" in the other print setting UI. This arrangement can call attention to the user when registering favorite setting.

(Modifications)

In the first to third embodiments, the method of registering a current print setting item group set in the print setting unit has been described. However, as another favorite addition method, the setting data 800 represented by the setting data 800*a* to 800*c* may be stored in a file format and imported to the print setting unit.

Figure 10:
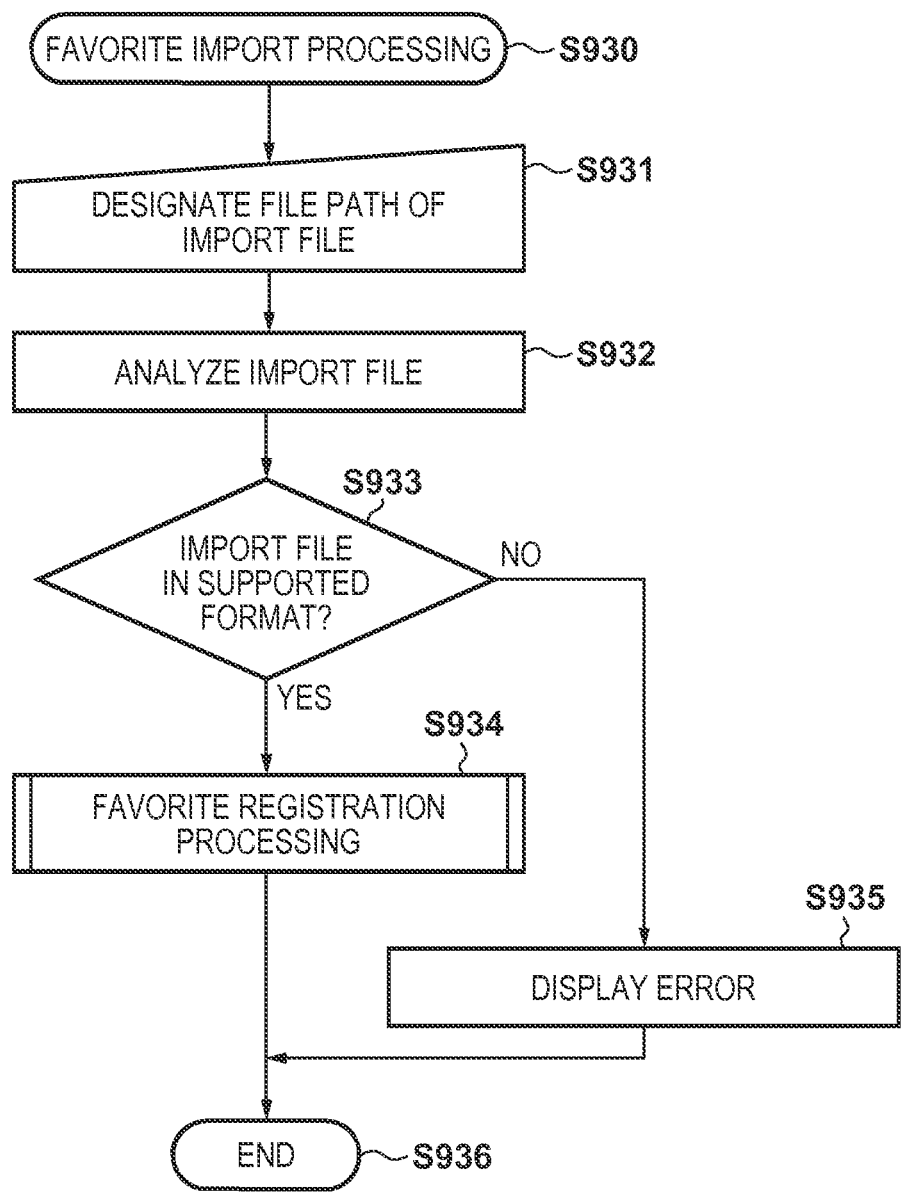
FIG. 10 is a flowchart of favorite import processing.

FIG. 10 is a flowchart of favorite import processing. This import processing is performed by the desktop UI print setting unit 3112 when an import button 6008 shown in FIG. 6 is pressed. The subject of the procedure is the desktop UI print setting unit 3112, unless otherwise specified.

First, the desktop UI print setting unit 3112 displays a UI to designate a file path and obtains the file path of the setting data 800 (step S931). Then, the desktop UI print setting unit 3112 determines whether the setting data 800 included in the file has a format supported by the desktop UI print setting unit 3112 (step S933). If the format is supported, favorite registration processing (step S934) described in the above embodiments is executed using the contents of the setting data 800 as the current print setting.

In the above embodiments, processing of adding one favorite setting has been described. However, the number of favorite settings is not particularly limited, and a plurality of favorite settings may be added continuously. The favorite setting addition UI need not particularly be displayed, and the favorite setting may be added in accordance with the setting of the initial value obtained in step S922 or S923.

As an example of the case where a plurality of favorite settings need to be added is a case where the other print setting UI, which was absent at the time of favorite registration, is installed after the registration. In this case, the desktop UI print setting unit 3112 performs the same determination processing as in the above embodiments for a registered favorite setting group, and registers a favorite in accordance with the setting of the initial value consequently obtained in step S922 or S923.

Note that the subject of the processing is not limited to the desktop UI print setting unit 3112, and the touch panel UI print setting unit 3122 to be installed or another functional unit such as an installer may perform the processing as the subject.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-052435, filed Mar. 14, 2014 which is hereby incorporated by reference herein in its entirety.

What is claimed is:

1. An information processing apparatus:
including at least one processor and at least a memory coupled to the at least one processor and having stored thereon instructions which, when executed by the at least one processor, cause the at least one processor to function as:
a first print setting unit configured to operate in a first execution environment of the information processing apparatus, and receive set values of a plurality of print setting items on a first print setting screen and save a set of the set values; and
a second print setting unit configured to operate in a second execution environment of the information processing apparatus, and receive set values of a plurality of print setting items on a second print setting screen and save a set of the set values,
wherein the first print setting unit is configured to obtain the set of the set values saved by the second print setting unit, display, on the first print setting screen, a first list of names each corresponding to a respective set in a plurality of sets of set values including the obtained set of the set values, and reflect the set values of the set corresponding to a name selected from the first list in set values of the plurality of print setting items on the first print setting screen,
wherein the second print setting unit is configured to obtain the set of the set values saved by the first print setting unit, display, on the second print setting screen, a second list of names each corresponding to a respective set in a plurality of sets of set values including the obtained set of the set values, and reflect the set values of the set corresponding to a name selected from the second list in set values of the plurality of print setting items on the second print setting screen.

2. The apparatus according to claim 1, wherein one of the first execution environment and the second execution environment is a user interface environment assuming a mouse operation, and the other is a user interface environment assuming a touch operation.

3. The apparatus according to claim 1, wherein said first print setting unit adds the set of the set values of one or more print setting items whose set values are different from initial set values to the first list in association with an identifier.

4. The apparatus according to claim 1, wherein said first print setting unit comprises a designation unit for designating permission/prohibition of use of the set of the set values by said second print setting unit, and
said second print setting unit is configured not to use the set of the set values for which prohibition of use is designated by said designation unit.

5. The apparatus according to claim 4, further comprising a first determination unit for determining whether the print setting items set by said first print setting unit are valid in said second print setting unit,
wherein said designation unit designates prohibition of use of the set of the set values by said second print setting unit if said first determination unit has determined that none of one or more print setting items that are received via said first print setting unit and have set values different from initial set values are valid in said second print setting unit.

6. The apparatus according to claim 5, wherein said designation unit designates permission of use of the set of the set values by said second print setting unit if said first determination unit has determined that at least one of the one or more print setting items that are received via said first print setting unit and have set values different from initial set values is valid in said second print setting unit, and
the information processing apparatus further comprises a first display unit for displaying a message representing that at least one of the print setting items corresponding to the set of the set values is not valid in said second print setting unit if said designation unit has designated permission of use of the set of the set values by said second print setting unit, and said first determination unit has determined that at least one of the print setting items corresponding to the set of the set values is not valid in said second print setting unit.

7. The apparatus according to claim 5, further comprising:
a second determination unit for determining whether the print setting items set by said first print setting unit can undergo a setting change by said second print setting unit; and
a second display unit for displaying a message representing that at least one of the print setting items corresponding to the set of the set values cannot undergo setting change by said second print setting unit if said designation unit has designated permission of use of the set of the set values by said second print setting unit, and said second determination unit has determined that at least one of the print setting items corresponding to the set of the set values cannot undergo the setting change by said second print setting unit.

8. The apparatus according to claim 1, wherein if the same set of set values as the set of the set values are already included in the first list or the second list, said first print setting unit prohibits the set of the set values from being stored in the first list.

9. An information processing method comprising:
a first print setting step of operating in a first execution environment of an information processing apparatus, receiving set values of a plurality of print setting items on a first print setting screen, and saving a set of the set values; and
a second print setting step of operating in a second execution environment of the information processing apparatus and receiving set values of a plurality of print setting items on a second print setting screen and saving a set of the set values, wherein the first print setting step obtains the set of the set values saved by the second print setting step, displays, on the first print setting screen, a first list of names each corresponding to a respective set in a plurality of sets of set values including the obtained set of the set values, and reflects the set values of the set corresponding to a name selected from the first list in set values of the plurality of print setting items on the first print setting screen, wherein the second print setting step obtains the set of the set values saved by the first print setting step, displays, on the second print setting screen, a second list of names each corresponding to a respective set in a plurality of sets of set values including the obtained set of the set values, and reflects the set values of the set corresponding to a name selected from the second list in set values of the plurality of print setting items on the second print setting screen.

10. The method according to claim 9, wherein one of the first execution environment and the second execution environment is a user interface environment assuming a mouse operation, and the other is a user interface environment assuming a touch operation.

11. The method according to claim 9, wherein said first print setting step adds the set of the set values of one or more print setting items whose set values are different from initial set values to the first list in association with an identifier.

12. The method according to claim 9, wherein said first print setting step comprises a designation step of designating permission/prohibition of use of the set of the set values by said second print setting step, and said second print setting step does not use the set of the set values for which prohibition of use is designated by said designation step.

13. The method according to claim 12, further comprising a first determination step for determining whether the print setting items set by said first print setting unit are valid in said second print setting step, wherein said designation step designates prohibition of use of the set of the set values by said second print setting step if said first determination step has determined that none of one or more print setting items that are received via said first print setting step and have set values different from initial set values are valid in said second print setting step.

14. The method according to claim 13, wherein said designation step designates permission of use of the set of the set values by said second print setting step if said first determination step has determined that at least one of the one or more print setting items that are received via said first print setting step and have set values different from initial set values is valid in said second print setting step, and the information processing method further comprises a first display step for displaying a message representing that at least one of the print setting items corresponding to the set of the set values is not valid in said second print setting step if said designation step has designated permission of use of the set of the set values by said second print setting step, and said first determination step has determined that at least one of the print setting items corresponding to the set of the set values is not valid in said second print setting step.

15. The method according to claim 13, further comprising:

a second determination step for determining whether the print setting items set by said first print setting step can undergo a setting change by said second print setting step; and a second display step for displaying a message representing that at least one of the print setting items corresponding to the set of the set values cannot undergo setting change by said second print setting step if said designation step has designated permission of use of the set of the set values by said second print setting step, and said second determination step has determined that at least one of the print setting items corresponding to the set of the set values cannot undergo the setting change by said second print setting step.

16. The apparatus according to claim 9, wherein if the same set of set values as the set of the set values are already included in the first list or the second list, said first print setting step prohibits the set of the set values from being stored in the first list.

17. A non-transitory computer-readable storage medium storing computer-executable process steps for causing a computer to perform an information processing method comprising:

a first print setting step of operating in a first execution environment of an information processing apparatus, receiving set values of a plurality of print setting items on a first print setting screen, and saving a set of the set values; and a second print setting step of operating in a second execution environment of the information processing apparatus, and receiving set values of a plurality of print setting items on a second print setting screen and saving a set of the set values, wherein the first print setting step obtains the set of the set values saved by the second print setting step, displays, on the first print setting screen, a first list of names each corresponding to a respective set in a plurality of sets of set values including the obtained set of the set values, and reflects the set values of the set corresponding to a name selected from the first list in set values of the plurality of print setting items on the first print setting screen, wherein the second print setting step obtains the set of the set values saved by the first print setting step, displays, on the second print setting screen, a second list of names each corresponding to a respective set in a plurality of sets of set values including the obtained set of the set values, and reflects the set values of the set corresponding to a name selected from the second list in set values of the plurality of print setting items on the second print setting screen.

* * * * *